United States Patent
Kramer et al.

(10) Patent No.: US 8,471,069 B2
(45) Date of Patent: Jun. 25, 2013

(54) MIXED BED POLYMERIC CATALYST

(75) Inventors: John Kramer, Midland, MI (US); Jose Antonio Trejo-O'Reilly, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 106 days.

(21) Appl. No.: 13/172,528

(22) Filed: Jun. 29, 2011

(65) Prior Publication Data

US 2012/0004467 A1 Jan. 5, 2012

Related U.S. Application Data

(60) Provisional application No. 61/360,294, filed on Jun. 30, 2010.

(51) Int. Cl.
 *C07C 45/73* (2006.01)
 *B01J 31/08* (2006.01)
 *B01J 37/04* (2006.01)

(52) U.S. Cl.
 USPC ........... 568/383; 568/396; 502/159; 502/224; 502/229

(58) Field of Classification Search
 USPC ......................... 568/396; 502/159, 224, 229
 See application file for complete search history.

(56) References Cited

U.S. PATENT DOCUMENTS

| | | | |
|---|---|---|---|
| 3,953,517 A | 4/1976 | Schmitt et al. | |
| 6,008,416 A | 12/1999 | Lawson et al. | |
| 6,977,314 B2 | 12/2005 | Vandersall et al. | |

FOREIGN PATENT DOCUMENTS

| | | |
|---|---|---|
| CN | 1232015 | 10/1999 |
| CN | 1288782 | 3/2001 |
| CN | 1457927 | 11/2003 |
| DE | 994137 | 12/1963 |
| DE | 11191113 | 7/1967 |
| EP | 1321450 | 6/2003 |
| GB | 1280368 | 7/1972 |
| JP | 48033724 | 10/1973 |
| KR | 2008035183 | 4/2008 |
| WO | WO9906585 | 2/1999 |
| WO | WO0222542 | 3/2002 |
| WO | WO2006056591 | 6/2006 |

OTHER PUBLICATIONS

Nicolaas M. Prinsloo, J. Pirow Engelbrecht, Thomas N. Mashapa, Margaret J. Strauss; Acetone to MIBK process optimization through multidisciplinary chemometrics and in-line NIR spectroscopy; Applied Catalysis A: General, vol. 344, Issues 1-2, Jul. 15, 2008, pp. 20-29.

Sandip Talwalkar, Sanjay Majajani; Synthesis of methyl isobutyl ketone from acetone over metal-doped ion exchange resin catalyst; Applied Catalysis A: General, vol. 302, Issue 1, Mar. 21, 2006, pp. 140-148.

Voronov, et al, "Mathematical modeling and optimization of a continuous cascade reactor for the synthesis of methyl isobutyl ketone from acetone and hydrogen", Khimicheskaya Promyshlennost (Moscow, Russian Federation), 8, 477-80 (1986).

Talwalkar, et al., "Synthesis of methyl isobutyl ketone from acetone over metal-doped ion exchange resin catalyst", App. Cat., Elsevier Science, vol. 302, No. 1, pp. 140-148 (2006).

Trejo, et al., "State of the Art Bifunctional Hydrogenation Heterogeneous Polymeric Catalyst", Kluwer Academic, vol. 53, No. 15-18, (2010).

*Primary Examiner* — Sikarl Witherspoon
(74) *Attorney, Agent, or Firm* — Carl P. Hemenway

(57) ABSTRACT

A mixed bed polymeric catalyst, and use of that catalyst, comprising 10-90% by weight of a first catalyst having ion exchange resin loaded with metal of palladium, platinum, iridium, rhodium, ruthenium, copper, gold, and/or silver and 10-90% by weight of a second catalyst having strong acidic ion exchange resin devoid of metal, where the metal is uniformly distributed throughout a mixed bed.

12 Claims, No Drawings

MIXED BED POLYMERIC CATALYST

This application claims the benefit of priority under 35 U.S.C. §119(e) of U.S. Provisional Patent Application No. 61/360,294 filed on Jun. 30, 2010.

This invention relates to mixed bed polymeric catalysts. More particularly, this invention relates mixed beds of metal-doped ion exchange resin catalysts and strong cation exchange resin catalysts.

Using metal-doped ion exchange resin catalysts in packed beds is known. For example, in U.S. Pat. No. 6,977,314, metal-doped polysulfonated cation exchange resin catalyst forms a bed of catalyst and is used to make ketones. GB 994137 and GB1191113 also disclose strongly acidic cation catalysts containing metal. GB994137 also discloses the use of activated carbon or activated alumina within the packed bed. However, it is difficult to achieve good mixing of activated carbon or alumina in an ion exchange bed and results in low selectivity, clogging of equipment due to the generation of small particles, and a pressure drop during hydrogenation processes.

The invention seeks to improve upon the current art by providing a mixed bed polymeric catalyst with both metal-doped ion exchange resin catalysts and strong acid ion exchange resin catalysts that has a highly desirable reaction conversion and uniform distribution of metal within a catalyst bed. The invention also allows adjustment of metal loading in relation to experimental conditions, such as process flow rate, temperature, and other conditions.

In a first aspect of the invention, there is provided a mixed bed polymeric catalyst comprising 10-90% by weight of a first catalyst having ion exchange resin loaded with metal of palladium, platinum, iridium, rhodium, ruthenium, copper, gold, and/or silver; and 10-90% by weight of a second catalyst having strong acidic ion exchange resin devoid of metal. The metal is uniformly distributed throughout a mixed bed.

In a second aspect of the invention, there is provided a use of the catalyst of the invention for hydrogenation of alkynes, alkenes, aldehydes, ketones, alcohols, nitriles, amines, and/or nitro groups.

In a third aspect of the invention, there is provided a method of preparing a ketone comprising providing a mixed bed of polymeric catalyst having 10-90% by weight of a first catalyst having ion exchange resins loaded with metal selected from one or more of palladium, platinum, iridium, rhodium, ruthenium, copper, gold, and silver; and 10-90% by weight of a second catalyst having strong acidic ion exchange resin devoid of metal, where the metal is uniformly distributed throughout a mixed bed, uniformly distributing the metal throughout the mixed bed, and synthesizing the ketone to produce a yield of 0.1 to 60%.

The invention is directed to a mixed bed polymeric catalyst. The mixed bed catalyst comprises a first and second catalyst, where the first catalyst contains metal and the second catalyst is devoid of metal. The first catalyst is an ion exchange resin loaded with metal. The second catalyst is a strong acidic ion exchange resin. "Strong acidic" in "strong acidic ion exchange resin" means that the pKa of the resin is less than 2 in water. The strong acidic ion exchange resin comprises a styrenic strong acid cationic resin having a moisture hold capacity from 10-90%, particle size from 100-2000 μm, and volume capacity from 0.5 to 7 meq/L (milliequivalents per liter). Examples of ion exchange resins include undersulfonated resins and polysulfonated resins. In a preferred embodiment, the ion exchange resin comprises a polysulfonated cation exchange resin, where the range of aromatic/sulfonic is from 10:1 to 1:2. The 1:2 is the sulfonation limit. Other resins that may be used for catalysis include acrylic backbone resins, such as weak acid cation resins, weak base anion resins, strong base anion resins and strong acid cation resins.

The ion exchange resins in both the first and second catalyst may be in the form of a gellular resin or macroporous beads. Preferably, the ion exchange resin catalysts are in the form of macroporous spherical beads having average particle diameters from 100 μm to 2 mm, more preferably, from 150 μm to 1.5 mm, and most preferably, from 250 to μm to 1 mm. When the ion exchange resin is a polysulfonated cation exchange resin, the content of the sulfonic acid group comprises, preferably, about 5.0 to 7.0, more preferably, about 5.1 to 6.5, and most preferably, about 5.2 to 6.0 meq/g (milliequivalents per gram), based on the dry weight of the polysulfonated cation exchange resin and is loaded with, preferably, about 0.1 to 10%, more preferably, about 0.5 to 5%, and most preferably, about 0.7 to 2%, of metal or metal ion, based on the dry weight of polysulfonated cation exchange resin.

Preferably, the ion exchange resins of both the first and second catalyst possesses a surface area from about 10 to 1000, more preferably, about 15 to 500, and most preferably, about 0.1 to 50 square meters/gram ($m^2/g$) and, preferably, has a total porosity of about 0.1 to 0.9, more preferably, about 0.2 to 0.7, and most preferably, about 0.25 to 0.5 cubic centimeter pores per gram of polymer ($cm^3/g$), with an average pore diameter of, preferably, about 50 to 2,500 Angstroms and more preferably, about 150 to 1000 Angstroms.

The ion exchange resins of both the first and second catalyst may be prepared from crosslinked macroporous copolymers, which are polymers or copolymers polymerized from a monomer or mixture of monomers containing at least 1 weight percent, based on the total monomer weight, of polyvinyl unsaturated monomer. The porosity is introduced into the copolymer beads by suspension-polymerization in the presence of a porogen (also known as a "phase extender" or "precipitant"), that is, a solvent for the monomer, but a non-solvent for the polymer.

A crosslinked macroporous copolymer preparation, for example, may include preparation of a continuous aqueous phase solution containing suspension aids (such as dispersants, protective colloids and buffers) followed by mixing with a monomer mixture containing 1 to 85% polyvinylaromatic monomer, free-radical initiator, and, preferably, about 0.2 to 5, more preferably, about 0.3 to 3, and most preferably, about 0.4 to 1, parts porogen (such as toluene, xylenes, ($C_4$-$C_{10}$)-alkanols, ($C_6$-$C_{12}$-saturated hydrocarbons or polyalkylene glycols) per one part monomer. The mixture of monomers and porogen is then polymerized at an elevated temperature and the porogen is subsequently removed from the resulting polymer beads by various means, for example, toluene, xylene and ($C_4$-$C_{10}$) alcohols may be removed by distillation or solvent washing and polyalkylene glycols may be removed by water washing. The resulting macroporous copolymer is then isolated by conventional means, such as dewatering followed by drying.

Suitable polyvinylaromatic monomers that may be used in the preparation of the crosslinked copolymers include, for example, one or more monomers selected from divinylbenzene, trivinylbenzene, divinyltoluene, divinylnaphthalene and divinylxylene, and mixtures thereof; it is understood that any of the various positional isomers of each of the aforementioned crosslinkers is suitable. In a preferred embodiment, the polyvinylaromatic monomer is divinylbenzene. Preferably, the crosslinked copolymer comprises about 1 to 85%, more preferably, about 5 to 55%, and most preferably, about 10 to 25%, polyvinylaromatic monomer units.

Optionally, non-aromatic crosslinking monomers, such as ethyleneglycol diacrylate, ethyleneglycol dimethacrylate, trimethylolpropane triacrylate, trimethylolpropane trimethacrylate, diethyleneglycol divinyl ether, and trivinylcyclohexane, may be used in addition to the polyvinylaromatic crosslinker. When used, the non-aromatic crosslinking monomers preferably comprise as polymerized units, from about 0 to 10%, more preferably, about 0 to 5%, and most preferably, about 0 to 2% of the macroporous polymer, based on the total monomer weight used to form the macroporous copolymer.

Suitable monounsaturated vinylaromatic monomers that may be used in the preparation of crosslinked copolymers include, for example, styrene, α-methylstyrene, ($C_1$-$C_4$) alkyl-substituted styrenes, halo-substituted styrenes (such as dibromostyrene and tribromostyrene), vinylnaphthalene, and vinylanthracene. Preferably, the monounsaturated vinylaromatic monomer is selected from styrene, ($C_1$-$C_4$)alkyl-substituted styrenes, and mixtures thereof. Included among the suitable ($C_1$-$C_4$)alkyl-substituted styrenes are, for example, ethylvinylbenzenes, vinyltoluenes, diethyl styrenes, ethylmethylstyrenes, and dimethylstyrenes. It is understood that any of the various positional isomers of each of the aforementioned vinylaromatic monomers is suitable. Preferably, the copolymer comprises about 15 to 99%, and more preferably, about 75 to 90%, monounsaturated vinylaromatic monomer units.

Optionally, non-aromatic monounsaturated vinyl monomers, such as aliphatic unsaturated monomers, for example, vinyl chloride, acrylonitrile, (meth)acrylic acids, and alkyl (meth)acrylates, may be used in addition to the vinylaromatic monomer. When used, the non-aromatic monounsaturated vinyl monomers may comprise as polymerized units, preferably, from about 0 to 10%, more preferably, from about 0 to 5%, and most preferably, from about 0 to 2% of the macroporous copolymer, based on the total monomer weight used to form the macroporous copolymer.

Porogens useful for preparing macroporous copolymers include hydrophobic porogens, such as ($C_7$-$C_{10}$) aromatic hydrocarbons and ($C_6$-$C_{12}$) saturated hydrocarbons, and hydrophilic porogens, such as ($C_4$-$C_{10}$)alkanols and polyalkylene glycols. Suitable ($C_7$-$C_{10}$) aromatic hydrocarbons include, for example, one or more of toluene, ethylbenzene, ortho-xylene, meta-xylene and para-xylene; it is understood that any of the various positional isomers of each of the aforementioned hydrocarbons is suitable. Preferably, the aromatic hydrocarbon is toluene or xylene or a mixture of xylenes or a mixture of toluene and xylene. Suitable ($C_6$-$C_{12}$) saturated hydrocarbons include, for example, one or more of hexane, heptane and isooctane; preferably, the saturated hydrocarbon is isooctane. Suitable ($C_4$-$C_{10}$)alkanols include, for example, one or more of isobutyl alcohol, tert-amyl alcohol, n-amyl alcohol, isoamyl alcohol, methyl isobutyl carbinol (4-methyl-2-pentanol), hexanols and octanols; preferably, the alkanol is selected from one or more ($C_5$-$C_8$) alkanols, such as, methyl isobutyl carbinol and octanol.

Polymerization initiators useful in preparing copolymers include monomer-soluble initiators, such as peroxides, hydroperoxides and related initiators, for example benzoyl peroxide, tert-butyl hydroperoxide, cumene peroxide, tetralin peroxide, acetyl peroxide, caproyl peroxide, tert-butyl peroctoate (also known as tert-butylperoxy-2-ethylhexanoate), tert-amyl peroctoate, tert-butyl perbenzoate, tert-butyl diperphthalate, dicyclohexyl peroxydicarbonate, di(4-tort-butylcyclohexyl)peroxydicarbonate, and methyl ethyl ketone peroxide. Also useful are azo initiators, such as azodiisobutyronitrile, azodiisobutyramide, 2,2'-azo-bis(2,4-dimethylvaleronitrile), azo-bis(.α-methylbutyronitrile) and dimethyl-, diethyl- or dibutyl azo-bis(methylvalerate). Preferred peroxide initiators are diacyl peroxides, such as benzoyl peroxide, and peroxyesters, such as tert-butyl peroctoate and tert-butyl perbenzoate; more preferably, the initiator is benzoyl peroxide. Use levels of peroxide initiator are, preferably, about 0.3% to 5%, more preferably, about 0.5 to 3%, and most preferably, about 0.7 to 2%, based on the total weight of vinyl monomers.

Preferably, the crosslinked copolymers are selected from divinylbenzene copolymer, styrene-divinylbenzene copolymer, divinylbenzene-ethylvinylbenzene copolymer and styrene-ethylvinylbenzene-divinylbenzene copolymer for use as substrates for the catalysts. These crosslinked copolymers may be functionalized with strong-acid functional groups according to conventional processes for polysulfonation known to those having ordinary skill in the art, as for example, sulfonation with sulfur trioxide ($SO_3$), fuming sulfuric acid or oleum (concentrated sulfuric acid containing sulfur trioxide), and chlorosulfonic acid. Alternatively, monosulfonated cation exchange resin polymers may also be subjected to conventional polysulfonation conditions to provide the polysulfonated cation exchange resin catalysts.

Exemplary metals in the first catalyst include palladium (Pd), platinum (Pt), iridium (Ir), rhodium (Rh), ruthenium (Ru), copper (Cu), gold (Au), silver (Ag), and mixtures thereof. The catalyst may be made with a zero valence state metal homogeneously dispersed in the resin. Preferably, the ion exchange resin catalysts contain 0.1 to 15% metal, based on dry weight of the catalyst.

Preferably, the mixed bed polymeric catalyst comprises 10-90% by weight of the first catalyst and 10-90% by weight of the second catalyst. The first catalyst may comprise as low as 1% of the total weight of the mixed bed polymeric catalyst and as high as 99% of the total weight of the mixed bed polymeric catalyst, depending on the desired results. Less of the first catalyst is preferred, however, because catalysts with metal are likely more costly. More preferably, the mixed bed polymeric catalyst comprises 15-25% by weight of the first catalyst and 75-85% by weight of the second catalyst, and most preferably, the mixed bed polymeric catalyst comprises 19-21% by weight of the first catalyst and 79-81% by weight of the second catalyst.

The mixed bed polymer catalyst achieves a desirable reaction conversion and uniform distribution of the bifunctional catalyst (first catalyst) and acid catalyst (second catalyst) within the catalyst bed. The metal loading that is required for the experimental condition may be adjusted. Possible reactions with the mixed bed polymer catalyst, include, but are not limited to, hydrogenation of alkynes, alkenes, aldehydes, ketones, alcohols, nitriles, amines, and nitro groups, and metal loading may be adjusted accordingly.

In one embodiment, the mixed bed polymeric catalyst is used to prepare a ketone. The metal is uniformly distributed throughout the mixed bed of the first and second catalyst and the ketone is synthesized to produce a yield of 0.1 to 60%.

The mixed bed polymeric catalyst comprises a yield of about 5-65% with a selectivity of 85-99%. In one embodiment, the catalyst comprises a yield of 30% with a selectivity of 97%. Yield is based on the amount of ketone produced and selectivity is based on the amount of ketone produced relative to the total product.

In a preferred embodiment of the invention, the mixed bed polymeric catalyst is in the physical form of beads contained in a vessel, the beads forming a bed of the catalyst. A feed stream of ketone reactant, or solvent, such as acetone, is brought into contact with the catalyst bed in the presence of hydrogen (as a separate feed stream) for a sufficient time and temperature for a condensation reaction of the ketone to occur. The condensed liquid stream, containing reaction products (saturated ketone adduct), byproducts (unsaturated ketone adduct), and any unreacted ketone reactant that may be present, is separated from the catalyst bed, and desired ketone adduct is recovered from the liquid stream by conventional separation means (such as distillation).

One of ordinary skill in the art will be able to choose appropriate conditions, such as (1) batch operation, for example, in which the catalyst bed is loaded with the liquid stream in the presence of hydrogen, or (2) the more preferred continuous operation, for example, where the liquid stream is fed continuously into one end of a column reactor (with hydrogen) at a rate that allows sufficient residence time in the catalyst bed for the desired reaction to occur, with the condensed liquid stream being removed continuously from the other end of the bed Similarly, the reaction equipment, the choice of upflow or downflow for the direction of passage of the reactant streams through the bed, the reaction time and temperature, the particular reactants, and the method of recovering the ketone adduct, are readily selected based upon the guidance provided herein and the knowledge available to one of ordinary skill in the art.

The temperatures and pressures inside the column reactor may be selected so that the ketone reactant is at its boiling point in the catalyst bed. Variation of temperature/pressure of the ketone reactant is used to provide the desired combination of reaction temperature and conditions such that the condensation reaction takes place in the liquid phase in the catalyst bed. Conditions may be varied to provide gas phase conditions with the catalyst bed, and the conditions may be such that the condensation reaction is conducted in the liquid phase. In a preferred embodiment, a trickle bed condition, where there is liquid and gas flowing through the catalyst bed, is used. In one embodiment, the gas is hydrogen and the equilibrium liquid/vapor is acetone. Choosing a higher pressure may provide more liquid.

The mixed bed polymeric catalysts of the invention may be used in condensation reactions where the ketone reactant and hydrogen are contacted under batch reaction conditions or under continuous reaction conditions. In one embodiment, the method is a continuous process based on a catalytic distillation process with the introduction of the ketone reactant being into the bottom of a column reactor immediately above a reboiler stage; in this case, the product fraction or stream is withdrawn continuously from the reboiler portion of the distillation apparatus for further processing. Preferably, the ketone reactant to undergo the condensation reaction is fed downward through the catalyst bed and a current of hydrogen is passed through the reaction zone in the same direction. However, other variations of introducing the reactant feed streams may be used, such as co-current and countercurrent hydrogen flow, flooding processes, and gaseous-phase processes.

For continuous processes, the amount of mixed bed polymeric catalyst to be used, relative to the amount of reactants, is typically related to the throughput rate of the reactions, as indicated by the LHSV (liquid hourly space velocity) or liquid flow rate of reactants relative to the volume of catalyst per unit time. High LHSV may be desirable to maximize equipment usage and generation of product; however, meeting this objective must be balanced against % conversion of raw materials and % selectivity to the desired product. If the LHSV is too low, production rate of the desired product (yield and selectivity) is diminished, and the process may not be economical. If the LHSV is too high, the catalyst activity will be insufficient to provide the desired level of conversion (the process becomes "kinetically limited"). Suitable values of LHSV will typically range from, preferably, 0.5 and 10 $h^{-1}$, more preferably, from 1 to 8 $h^{-1}$, and most preferably, from 2 to 4 $h^{-1}$.

The ketone reactant may be contacted with hydrogen in the presence of the catalyst at a temperature of 65 to 200° C. and at a pressure from 1 to 100 bar (0.1 to 10 MPa) of hydrogen. Typically, the condensation reaction is conducted at a hydrogen/ketone reactant molar ratio of at least 1:1.

In another embodiment of the invention, the process may be a batch reaction with the introduction of the ketone reactant into a reactor column at the reboiler section stage of a catalytic distillation apparatus (similar to that described above). The process may then be terminated when a desired product composition of ketone adduct is achieved in the reboiler section. Alternatively, the condensation may be carried out in a batch autoclave reactor for a specified period of time, followed by cooling and recovery of the desired of the ketone adduct by distillation or other conventional means.

In one illustrative example of the invention, a mixed bed of ion exchange resin catalysts is formed from one ion exchange resin loaded with 0.7% by weight Pd and the other ion exchange resin in its pure acid form. The lower overall Pd loading effectively reduces undesirable isopropyl alcohol side product formation, while the high acidity of the catalyst mixture helps to maintain a high yield of MIBK. Furthermore, both catalysts have similar particle size distribution, specific gravity, and volume change, allowing for stable mixtures or layering within the catalyst bed as desired. Thus, the use of a mixed Pd-doped/acid resin catalyst system improves MIBK selectivity by reducing IPA formation, uses less Pd per catalyst bed, maintains the high yields associated with the higher Pd-loaded catalysts, and preserves uniform distribution of the metal throughout the catalyst bed.

The following examples are presented to illustrate the invention. In the examples, the following abbreviations have been used.

GC is gas chromatograph.
IPA is isopropyl alcohol.
MIBK is methyl isobutyl ketone.
MPa is megaPascal.
rpm is rotations per minute.
wt % and %-w are weight percent.
C is Celsius; ml is milliliter; µl is microliter; s is second; min is minute; kg is kilogram; mg/mL is milligrams per milliliter; in is meter; and cm is centimeter.

Test Methods

Yield, Conversion, and Selectivity: The product from reaction was injected in a GC chromatograph. The different reaction products were analyzed and quantified. The acetone conversion was the acetone that reacts to make products, the product yield was the amount of desired product obtained, and the selectivity was the ratio of target product to all the products determined by GC.

Dual Column GC-FID Method Description:

Carrier Gas: $N_2$ from High Pressure house Nitrogen
Injector: 0.2 µl volume
Inlet: Front, Mode: split, Temperature: 250° C., Pressure: 5.4 psi (37 kPa)
Split ratio: 50.0 to 1, Split flow 73.0 ml/min; Total flow 76.6 ml/min
Gas saver: 20.0 ml/min @ 2.00 min Columns:
Column 1: Macherei Nagel 726600. Optima Wax. 30 m×250 µm×0.25 µm Constant Pressurure, Inlet: Front, Outlet: Front Nitrogen flow: Pressure 5.4 psi (37 kPa), Flow 0.7 ml/min, Average velocity 20 cm/s Column 2: Varian CP9151 VF1701MS Capillary 30.0 m×250 μm×0.25 μm Constant Pressure, Inlet: Front, Outlet: Back Nitrogen flow: Pressure 5.4 psi (37 kPa), Flow 0.7 ml/min, Average velocity 20 cm/s Oven:
  Setpoint: 40° C.
  Hold time: 5 min
  Ramp 1: 5.0° C./min to 115° C.
  Ramp 2: 15.0° C./min to 240° C.
  Final time: 6.67 min @ 240° C.
  Total run time: 35 min Detectors:
  Front FID: Heater: 250° C.
  Flows: $H_2$: 30 ml/min, Air: 350 ml/min, Makeup $N_2$: 30 ml/min
  Signal 1: Data rate 20 Hz, peak width 0.01 min, Start 0, End 35 min
  Back FID: Heater: 250° C.
  Flows: $H_2$: 30 ml/min, Air: 350 ml/min, Makeup $N_2$: 30 ml/min
  Signal 2: Data rate 20 Hz, peak width 0.01 min, Start 0, End 35 min

TABLE 1

Standards for Testing for Yield, Conversion and Selectivity

| Compound Name | CAS # |
| --- | --- |
| Acetone | |
| Benzene, 1,2,4 trimethyl- | 95-63-6 |
| Diacetone alcohol | 123-42-2 |
| Diisobutyl ketone (DMH1) | 108-83-8 |
| 2-Heptanone, 4,6-dimethyl-(DMH2) | 19549-80-5 |
| Isopropyl alcohol | 67-63-0 |
| 4-Methyl-2-pentanol (MIBC) | 108-11-2 |
| Methyl Isobutyl Ketone (MIBK) | 108-10-1 |
| 3-Penten-2-one, 4-methyl-(MSO) | 141-79-7 |
| Pentane, 2-methyl- | 107-83-5 |

EXAMPLES

Example 1

Mixed Bed Catalyst Screen in Small Scale Batch Reactor

Different % by weight ratios were used in the blends of AMBERLYST™CH28 (Pd-loaded ion exchange resin) and AMBERLYST™252H, AMBERLYST™ is a registered trademark of Rohm and Haas Company, a wholly owned subsidiary of The Dow Chemical Company, (strong acid cationic resin with no Pd). The mixture of resins was tested using a batch reactor under hydrogenation conditions of 200 psi (1.38 MPa) at 110° C. for 4 hours while stirring at 1000 rpm. Yields were determined by GC analysis and are shown in Table 1.

TABLE 1

Product Yields at Varying AMBERLYST ™ CH28/252H Ratios

| Reaction | AMBERLYST ™ CH28 % | | | | | | | |
| --- | --- | --- | --- | --- | --- | --- | --- | --- |
| Products | 100 | 75 | 50 | 25 | 20 | 15 | 10 | 5 |
| MIBK (mg/mL) | 241.2 | 232.2 | 223.3 | 230.9 | 221.0 | 196.0 | 169.9 | 119.1 |
| IPA (mg/mL) | 2.4 | 1.5 | 0.8 | 0.4 | 0.2 | 0.1 | 0.1 | 0.1 |

As shown in Table 1, the yield of MIBK remains consistent down to a 20:80 AMBERLYST CH28:AMBERLYST 252H resin ratio. Only below 20% CH28 was there a drop in MIBK yields. Moving from 100% CH28 to 20% provides a significant reduction in IPA formation, one of the most problematic side products from MIBK synthesis. Thus, improved selectivity for MIBK over IPA was realized at lower levels of Pd-impregnated catalysts, which also represented a significant cost reduction (nearly 5×) compared to using pure CH28 catalyst. CH28 near 20% was optimal for maximizing the MIBK yield while producing the least possible IPA.

Example 2

Selectivity Data from Batch Reactor Study

TABLE 2

% Yields at Different AMBERLYS ™ CH28 Ratios

| Reaction Products | AMBERLYST ™ CH28 % | | | | | | | |
| --- | --- | --- | --- | --- | --- | --- | --- | --- |
| | 100 | 75 | 50 | 25 | 20 | 15 | 10 | 5 |
| Acetone (wt %) | 56.2 | 56.4 | 54.4 | 58.2 | 52.5 | 54.6 | 59.9 | 67.1 |
| MIBK (wt %) | 42.5 | 42.3 | 43.4 | 39.9 | 44.9 | 42.4 | 36.0 | 26.3 |
| IPA (wt %) | 0.42 | 0.27 | 0.16 | 0.069 | 0.041 | 0.028 | 0.023 | 0.024 |
| DIBK (wt %) | 0.93 | 1.2 | 2.1 | 1.6 | 2.4 | 2.6 | 2.4 | 2.0 |
| Mesityl Oxide (wt %) | 0 | 0 | 0 | 0.054 | 0.081 | 0.22 | 1.5 | 4.4 |
| Mesitylene (wt %) | 0 | 0 | 0.18 | 0.055 | 0.11 | 0.11 | 0.17 | 0.24 |

Example 3

Comparative Results

TABLE 3

% Yields and Selectivity

| Patent Number | GB994137<br>U.S. Pat. No. 3,574,763<br>GB1191113 | GB 1280368 | GB 1280368 | U.S. Pat. No. 6,977,314 |
|---|---|---|---|---|
| Resin | Dowex 50W-X8 | Dowex 50W-X8 | Dowex 50W-X8 | Amberlyst ™ CH28 |
| Type of Resin | Gel | Gel | Gel | Macroreticular resin |
| Reduction Method | Hydrogen | Hydrazine reduction | Hydrazine reduction | Hydrogen |
| Pd loading (%-w dry) | 1.5 | 1.5 | 1.5 | 0.7 |
| Pressure | | 40 kg/cm$^2$ | 20 kg/cm$^2$ | 440 psi (30 bar, 3.03 MPa) |
| Temperature (° C.) | 125-130 | 135 | 100 | 130 |
| LHSV (h$^{-1}$) | 2.4 | Batch | Batch | 2.8 |
| | | %-w by GC | | |
| Acetone | 43.3 | 44.8 | 78 | 38.4 |
| MIBK | 44.5 | 37.0 | 19 | 36.0 |
| IPA | 0.3 | | 0 | |
| DIBK | 2.0 | 0.8 | 0.2 | |
| Higher Ketones | 0.7 | 0.4 | | |
| %-w Selectivity MIBK | 92.7 | 96.0 | 99 | 93.7 |
| %-w Selectivity of IPA | 0.63 | | 0.61 | |

Example 4

Continuous Process MIBK Synthesis 30 ml of total catalyst were charged in a flow through continuous reactor. The catalyst was washed with acetone with 300 ml of acetone at 60° C. under hydrogenation condition at 1.3 MPa for 8 hours prior to being used for MIBK synthesis. The testing was done at 100° C., 1.4 MPa of hydrogen, hydrogen flow rate of 300 cm$^3$/minute and acetone LHSV 2 (h$^{-1}$). The reaction time was 6 hours and at the end of that period of time line samples were taken and analyzed by GC method. The carbon accountability for the process was 99%. GC method was used to estimate the reaction selectivity for MIBK and isopropyl alcohol (IPA). Selectivity of reaction was calculated by the %-weight of each product generated during the synthesis process and measured by gas chromatography.

| | Column 1 | Column 2 |
|---|---|---|
| Pd loaded Resin | AMBERLYST ™ CH28 | AMBERLYST ™ CH28 |
| Strong Acid Cationic Polymeric Catalyst non metal loaded | | AMBERLYST ™ 16 |
| % of each resin | 100/0 | 75/25 |
| % Pd-dry basis in reactor | 0.7 | 0.5 |
| PRESSURE (MPa) | 1.3 | 1.3 |
| Temperature (° C.) | 100 | 100 |
| LHSV (h−1) | 2 | 2 |

-continued

| | Column 1 | Column 2 |
|---|---|---|
| % Selectivity and conversion: | | |
| Acetone Conversion %-w | 20 | 20 |
| % MIBK selectivity | 94 | 99 |
| % IPA selectivity | 5 | 1 |

What is claimed is:

1. A mixed bed polymeric catalyst comprising:
   10-90% by weight of a first catalyst having ion exchange resin loaded with metal selected from at least one of palladium, platinum, iridium, rhodium, ruthenium, copper, gold, and silver; and
   10-90% by weight of a second catalyst having strong acidic ion exchange resin devoid of metal,
   the metal being uniformly distributed throughout a mixed bed.

2. The catalyst of claim 1 wherein the first catalyst comprises 0.1 to 15% metal ion, based on dry weight of the first catalyst, distributed therein.

3. The catalyst of claim 1 wherein the strong acidic ion exchange resin comprises a styrenic strong acid cationic resin having a moisture hold capacity from 10-90%, particle size from 100-2000 um, and volume capacity from 0.5 to 7 meq/L.

4. The catalyst of claim 1 wherein the metal comprises a zero valent metal.

5. The catalyst of claim 1 wherein the first catalyst comprises 15-25% by weight of the mixed bed polymeric catalyst.

6. The catalyst of claim 1 wherein the metal comprises palladium.

7. The catalyst of claim 1 wherein the second catalyst comprises a gellular resin.

8. The catalyst of claim 1 wherein the first catalyst comprises a particle size of 100 μm to 2 mm and the second catalyst comprises a particle size of 100 μm to 2 mm.

9. A method of preparing a saturated ketone adduct comprising:
   providing a mixed bed of polymeric catalyst having 10-90% by weight of a first catalyst having ion exchange resins loaded with metal selected from one or more of palladium, platinum, iridium, rhodium, ruthenium, copper, gold, and silver; and 10-90% by weight of a second catalyst having strong acidic ion exchange resin devoid of metal, the metal being uniformly distributed throughout a mixed bed;
   uniformly distributing the metal throughout the mixed bed; and
   bringing a feed stream of a ketone reactant into contact with the mixed bed of polymeric catalyst in the presence of a separate feed stream of hydrogen
   to produce a yield of the saturated ketone adduct of 0.1 to 60%.

10. The method of claim 9 wherein the ketone reactant is acetone.

11. The method of claim 9 wherein the saturated ketone adduct is acetone.

12. The method of claim 9 wherein the ketone reactant is acetone and wherein the saturated ketone adduct is acetone.

* * * * *